(12) United States Patent
Lockridge et al.

(10) Patent No.: US 7,991,014 B2
(45) Date of Patent: Aug. 2, 2011

(54) METHOD AND SYSTEM FOR REMOTE TUNING AND CLOCK SYNCHRONIZATION

(75) Inventors: Terry Wayne Lockridge, Dayton, OH (US); Mike Arthur Derrenberger, Fishers, IN (US); Daniel Thomas Wetzel, Dayton, OH (US)

(73) Assignee: Thomson Licensing, Issy les Moulineaux (FR)

( * ) Notice: Subject to any disclaimer, the term of this patent is extended or adjusted under 35 U.S.C. 154(b) by 1041 days.

(21) Appl. No.: 10/537,750

(22) PCT Filed: Dec. 4, 2003

(86) PCT No.: PCT/US03/38753
§ 371 (c)(1),
(2), (4) Date: Jun. 6, 2005

(87) PCT Pub. No.: WO2004/054157
PCT Pub. Date: Jun. 24, 2004

(65) Prior Publication Data
US 2006/0153182 A1    Jul. 13, 2006

Related U.S. Application Data

(60) Provisional application No. 60/431,526, filed on Dec. 6, 2002, provisional application No. 60/433,443, filed on Dec. 13, 2002.

(51) Int. Cl.
*H04J 3/00* (2006.01)
(52) U.S. Cl. .......................................... 370/498; 370/503
(58) Field of Classification Search .................. 370/389, 370/503, 509, 510, 512
See application file for complete search history.

(56) References Cited

U.S. PATENT DOCUMENTS
5,566,174 A    10/1996 Sato et al.
(Continued)

FOREIGN PATENT DOCUMENTS
EP    1032195 A    8/2000
(Continued)

OTHER PUBLICATIONS
Search Report Dated Jan. 31, 2005.
(Continued)

*Primary Examiner* — Chirag G Shah
*Assistant Examiner* — Minh-Trang Nguyen
(74) *Attorney, Agent, or Firm* — Robert D. Shedd; Vincent E. Duffy; Michael A. Pugel

(57) ABSTRACT

The disclosed embodiments relate to a system for providing remote tuning and clock synchronization in a network. The system includes a device that receives a signal that includes a plurality of channels, a device that receives a user request indicative of a desire to view at least one of the plurality of channels, and a filter that filters the received signal and transmits a user signal corresponding to the at least one of the plurality of channels to the user. An alternative embodiment of the system includes a device that receives a signal that includes a plurality of packets, at least a portion of the plurality of packets comprising an embedded time stamp, a device that detects the at least a portion of the plurality of packets containing the embedded time stamp, and a device that computes an adjusted time stamp based on the embedded timestamp and a precision local clock and incorporates the adjusted timestamp into the at least a portion of the plurality of packets containing the embedded timestamp prior to transmitting the at least a portion of the plurality of packets to the network.

10 Claims, 4 Drawing Sheets

U.S. PATENT DOCUMENTS

| | | | |
|---|---|---|---|
| 5,640,388 A | 6/1997 | Woodhead et al. | |
| 5,805,602 A | 9/1998 | Cloutier et al. | |
| 5,822,324 A | 10/1998 | Kostresti et al. | |
| 5,896,427 A | 4/1999 | Muntz et al. | |
| 6,111,896 A | 8/2000 | Slattery et al. | |
| 6,278,710 B1 * | 8/2001 | Eidson | 370/394 |
| 6,370,153 B1 | 4/2002 | Eng | |
| 6,640,239 B1 | 10/2003 | Gidwani | |
| 6,731,657 B1 | 5/2004 | Anderson et al. | |
| 6,996,101 B2 * | 2/2006 | Coupe et al. | 370/389 |
| 7,106,949 B1 | 9/2006 | Pieper | |
| 7,263,713 B2 | 8/2007 | Oishi et al. | |
| 2002/0107940 A1 * | 8/2002 | Brassil | 709/219 |
| 2003/0153369 A1 * | 8/2003 | Laiho et al. | 455/574 |

FOREIGN PATENT DOCUMENTS

| | | |
|---|---|---|
| GB | 2359429 | 8/2001 |
| JP | 6292039 | 10/1994 |
| JP | 2000-228685 | 8/2000 |
| JP | 2001245175 | 9/2001 |
| JP | 2001-285205 | 10/2001 |
| JP | 200153764 | 3/2002 |
| JP | 2002112205 | 4/2002 |
| KR | 2000-76621 | 6/2007 |
| WO | WO0245304 | 6/2002 |

OTHER PUBLICATIONS

Supplementary European Search Report Dated Apr. 2, 2006.

* cited by examiner

| IP Header |
|---|
| UDP Header |
| Transport Header |
| NTS |
| $SCR_N$ |
| $SCR_n$ |
| $RTSL_N$ |
| $RTSL_n$ |

60

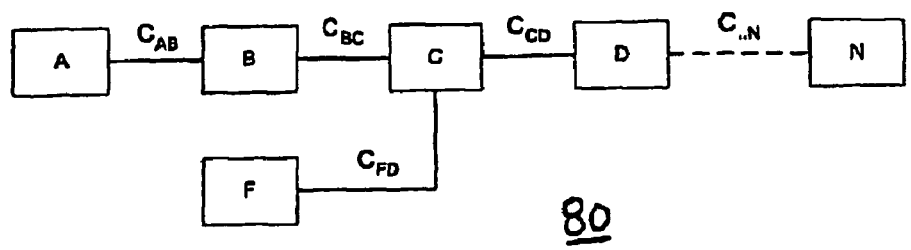
Fig. 4
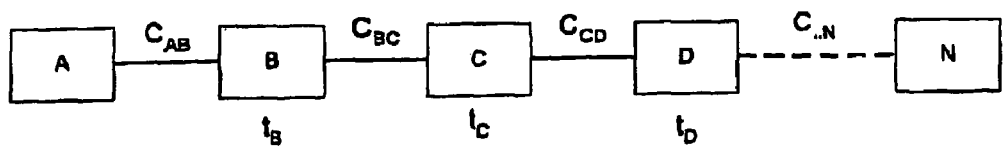
Fig. 5
| ACTS |
|---|
| Clock Rate |
| Delay Ticks |
100
Fig. 6

METHOD AND SYSTEM FOR REMOTE TUNING AND CLOCK SYNCHRONIZATION

This application claims the benefit, under 35 U.S.C. §365 of International Application PCT/US03/38753, filed Dec. 4, 2003, which was published in accordance with PCT Article 21 (2) on Jun. 24, 2004 in English and Which claims the benefit of U.S. provisional patent application Ser. No. 60/431,526, filed Dec. 6, 2002 and U.S. provisional patent application No. 60/433,443, filed Dec. 13, 2002.

FIELD OF THE INVENTION

The present invention relates to providing video services in a Multi-Dwelling or Multi-Tenant network. More particularly, the present invention relates to a method and system for remote tuning and clock synchronization.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the last few years, many multi-dwelling ("MxU") establishments, such as hotels, motels, apartments and the like have begun to expand into the business of providing digital data signals, such as digital video or internet services, to their patrons. Besides providing higher quality video than older analog video systems, digital data systems provide the hotel or motel owner the flexibility to supply video-on demand, internet access, and pay-per-view video to each room over one connection. Further, because hotel and motel operators are also usually able to charge residents a premium for digital data services, an increasing number of multi-dwelling establishments are investing in digital data systems. Unfortunately, distribution of digital broadcast signals, such as satellite broadcasts, over wires/networks requires significant amounts of bandwidth. Providing and maintaining this bandwidth can be expensive or prohibitive for the owners of multi-dwelling establishments.

A further problem in the distribution of digital data to a multi-dwelling establishment is the problem of clock jitter. A stable timing clock is vital to the decoding of digital signals because the system clock is used for buffer and color burst control. Without a stable timing clock, the video quality and reliability can be degraded.

Typically, a video broadcast system, such as satellite or cable, will embed a clock signal within the audio/video ("A/V") data signal by time stamping certain transport packets within the A/V data signal as they are broadcast. Because the delivery of the transport streams is deterministic, the time stamps provide a relative time base between the packets of this type. When one of these packets is received, the receiving system compares its local clock to the time stamp and creates a relative time base. By comparing multiple time stamps within the A/V data signal, the receiving system is able to adjust its local clock until it matches the broadcaster's clock. This type of clock recovery is typically used in digital video broadcast system today. However, because the MxU system converts the A/V data signal into Internet Protocol ("IP") packets introducing jitter, the conventional method of clock recovery will not work for network set top box systems.

SUMMARY OF THE INVENTION

The disclosed embodiments relates to a system for providing remote tuning and clock synchronization in a network. The system includes a device that receives a signal that includes a plurality of channels, a device that receives a user request indicative of a desire to view at least one of the plurality of channels, and a filter that filters the received signal and transmits a user signal corresponding to the at least one of the plurality of channels to the user. An alternative embodiment of the system may include a device that receives a signal that includes a plurality of packets, at least a portion of the plurality of packets comprising an embedded time stamp, a device that detects at least a portion of the plurality of packets containing the embedded time stamp, and a device that computes an adjusted time stamp based on the embedded timestamp and a precision local clock and incorporates the adjusted timestamp into the at least a portion of the plurality of packets containing the embedded timestamp prior to transmitting the at least a portion of the plurality of packets to the network.

BRIEF DESCRIPTION OF THE DRAWINGS

In the drawings:

FIG. 4 is a block diagram of a network in which embodiments of the present invention may be employed;

FIG. 5 is a block diagram of an alternative network configuration in which embodiments of the present invention may be employed;

FIG. 6 is a block diagram of a clock recovery packet in accordance with embodiments of the present invention;

The characteristics and advantages of the present invention will become more apparent from the following description, given by way of example.

DETAILED DESCRIPTION

One or more specific embodiments of the present invention will be described below. In an effort to provide a concise description of these embodiments, not all features of an actual implementation are described in the specification it should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary-skill having the benefit of this disclosure.

Figure 1:
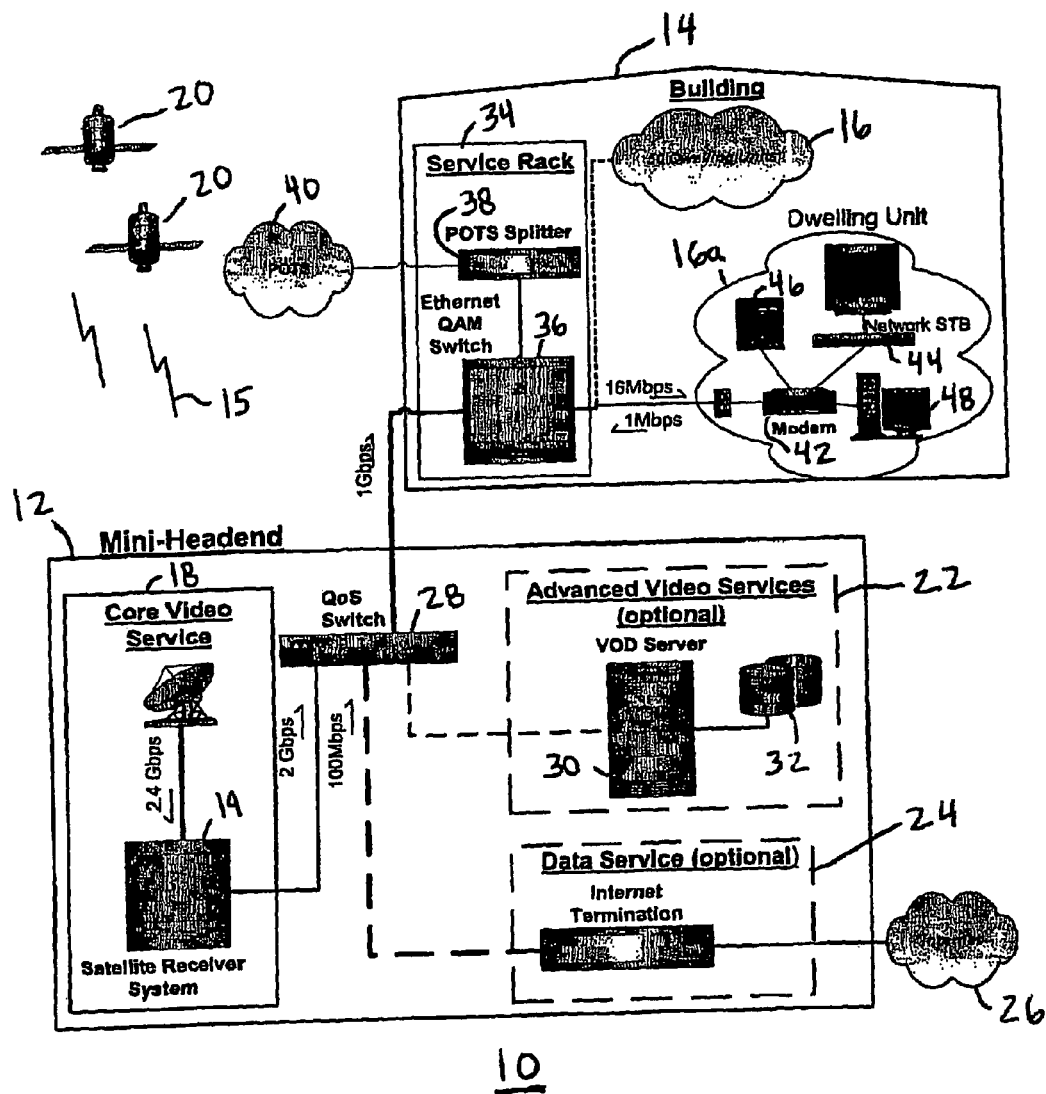
FIG. 1 is a block diagram of a digital data system adapted for use in a Multi-Dwelling Unit in accordance with embodiments of the present invention.

Turning now to the drawings and referring initially to FIG. 1, a block diagram of a digital data system adapted for use in a Multi-Dwelling Unit in accordance with embodiments of the present invention and designated using a reference numeral 10. The digital data system 10 is an integrated-digital data system to provide broadband, digital video, and services to multiple users. An additional feature of the digital data system 10 is its ability to integrate quality audio and video with digital IP data services for multiple users. Further, the digital data system 10 is designed to provide a platform to launch a variety of cost effective digital services and is designed to be both scalable and to allow different digital data services to be added incrementally.

The digital data system 10 includes a Mini-Headend unit 12 where digital audio, video, and data services are received, aggregated together and distributed throughout a Multi-Dwelling Unit or Multi-Tenant Unit ("MxU") network 14. The MxU network 14 may be located in one or more apartment buildings, hotels, or any other structure where there are multiple clients desiring digital audio, video, or data services.

The Mini-Headend unit 12 is responsible for receiving data, providing Quality of Service ("QoS") in accordance with industry standards, providing customized services, and routing data to dwelling units 16 in the MxU network 14. A Core Video Service System 18, an Advanced Video Services System 22, a Data Service System 24 communicatively connected to the Internet 26, and a Gigabit QoS Ethernet Switch 28 may also be included in the Mini-Headend unit 12.

The Core Video Service System 18 preferably includes a Satellite Receiver System 19 that is communicatively coupled to orbiting satellites 20. The satellites 20 transmit a signal 15 that is received by the Core Video Service System 18. In one embodiment, the Satellite Receiver System 19 receives A/V data signals from a Satellite video provider, such as DirecTV. An additional feature of the Satellite Receiver System 19 is the ability to scale the number of A/V data signals received from the orbiting satellites 20 based on how many users request services. More specifically, in this embodiment, the Satellite Receiver System 19 runs a multicast server to allow a Network Set Top Box ("NSTB") 44 in the dwelling units 16 to request A/V data signals. The NSTB may be capable of requesting data from the Mini-Headend unit and may be capable of decrypting and decoding video streams. The number of satellite transponders that the Satellite Receiver System 19 is able to receive can be adjusted by scaling the number of tuning blades in the chassis up or down. A fully-loaded chassis or the like can contain numerous transponders and may be able to handle an input data rate of 2.4 Gbps or higher. Once the satellite signals are received, the Satellite Receiver System 19 can output IP data packets to the Gigabit QoS Ethernet switch 28. The IP data packets may also conform to QoS specifications set forth in IEEE 802.1 p (entitled "Traffic Class Expediting and Dynamic Multicast Filtering") and IEEE 802.1q (entitled "Virtual LA/Vs"), which are incorporated by reference.

The Satellite Receiver System 19 may have a 1 Gbps Ethernet port which functions as a network interface. The network interface can also be expanded to include another Ethernet port if desired. In addition, a management system that accepts requests for programs from the clients may also be included in the Satellite Receiver System 19. The management system can allow the user to select a satellite, transponder, and program IDs, which in turn could allow the Satellite Receiver System 19 to provide specific program streams to the user. The management system may also support multicasting to save bandwidth. Although the Satellite Receiver System 19 and the satellites 20 are illustrated as the content delivery medium in FIG. 1, the use of other media (e.g., cable, fiber and the like) for delivering content is considered within the scope of the invention.

The Advanced Video Services System 22 is a platform that works in conjunction with the Satellite Receiver System 19 to enable additional digital video services. Because it is scalable, the Advanced Video Services System 22 can be adjusted depending on the number of users that use the service. For example, the Advanced Video Services System 22 may require more servers 30 as the number of users increases. The types of services provided by the Advanced Video Services System 22 may include Video On Demand, Near Video On Demand, Limited Video On Demand, Nielsen Ratings, Time Shift, Auto Record, Personal Video Recording ("PVR"), and the like. A Conditional Access System can also be used in conjunction with the Advanced Video system 22 for program streams that are recorded to hard drive(s) 32.

When recording, the original program stream received from the Satellite Receiver System 19 is decrypted, picture data is extracted, and a new program stream (containing the extracted picture data) is encrypted and stored onto the hard drive 32. In this embodiment, the network provider's conditional access system is terminated at the Advanced Video System Server 30 and the new conditional access system is used thereafter.

The Data Service System 24 may be used to provide internet access to the MxU network 14. Amongst other features, the Data Service System 24 has the ability to be scaled according to the number of clients using internet service and the required speed or bandwidth of the internet service. The Data Service System 24 can be supplied through a separate device or integrated into the Satellite Receiver. The devices may be able to provide Quality of Service ("QoS") to insure the quality of the video.

As stated above, the Mini-Headend unit 12 may contain the Gigabit QoS Ethernet Switch 28 to provide connectivity between the Core Video Services System 18, the Advanced Video Services System 22, the Data Services System 24, and the MxU network 14. While the Gigabit QoS Ethernet Switch 28 may be needed for medium to large systems, it may be removed in small installations. The Gigabit QoS Ethernet Switch 28 supports full-duplex Gigabit Ethernet interfaces and is scalable to support systems of various sizes. The Gigabit QoS Ethernet Switch 28 may also support a QoS standard as set forth in the IEEE 802.1p and 802.1q standards. The QoS standard can facilitate communication between the Gigabit QoS Ethernet Switch 28, the Core Video Services System 18, the Advanced Video Services System 22, and the Data Services System 24 by giving a higher priority to video data than internet data from the Data Service System 24. For example, when video data and internet data are simultaneously requested, video data is transmitted first and the internet data is delayed until sufficient bandwidth becomes available. The type of services being provided and the number of dwelling units 16 that are in the MxU network 14 are a few of the many factors that one of ordinary skill in the art must consider in selecting the Gigabit QoS Ethernet Switch 28.

The MxU network 14 also can include one or more service racks 34. The service rack 34 is scalable according to the number of the dwelling units 16 in the MxU network 14. In the one embodiment of the invention, the service rack 34 is located where the phone lines in the MxU network 14 come together. The number of MxU networks 14 in the digital data system 10 dictates the number of the service racks 34 that are required. Preferably, one of the service racks 34 is provided for each of the MxU networks 14 (e.g., buildings) in a multi-network environment (e.g., a multiple building complex). Each of the service racks 34 may include a VDSL switch 36 that uses a Plain Old Telephone Service ("POTS") Splitter 38 to combine POTS service 40 with the digital video, audio, and data received from the Gigabit QoS Ethernet Switch 28 of the Mini-Headend 12. Although the VDSL switch 36 is illustrated as being an Ethernet Quadrature Amplitude Modulation ("QAM") switch, any other appropriate switch is considered within the scope of the present invention.

In the digital data system 10, each of the dwelling units 16 may include a modem 42, a Network Set Top Box ("NSTB") 44, both the modem 42 and the NSTB 44, or an integrated modem and NSTB unit. One example of the NSTB 44 is a DirecTV set top box that has been configured to interface with the Mini-Headend unit 14. The modem 42 is one example of a device that may be used by the NSTB to access digital data, audio, and video services. The modem 42 may be connectable to the VDSL switch 36 via phone lines and can terminate the VDSL line. The modem 42 may also have a POTS Splitter and a connection for phone services 46. The modem 42 may also have an Ethernet port to provide one or more computers 48 access to the internet in addition to providing the NSTB 44 access to audio, video, and data services.

Although phone lines are shown in FIG. 1 the communication medium between the dwelling units 16, the service rack 34, and the Mini-Headend unit 12, other appropriate forms of networking, including cable and wireless networks, are considered within the scope of the invention.

An important component of the architecture of FIG. 1 is the capability of remote tuning. Remote tuning removes the satellite tuning functions from the NSTB 44 and transfers them to the Mini-Headend unit 12. In the embodiment shown in FIG. 1, the tuning function takes place within the Satellite Receiver System 19. The transfer of the tuning function, which may include tuning, demodulation, and demultiplexing, to the Mini-Headend unit 12 permits the network to operate on less bandwidth because only a limited subset of data that the Satellite Receiver System 19 actually receives is transmitted to the NTSB 44.

In operation, when the remote tuning function in the Satellite Receiver System 19 receives a request from a NSTB 44, it processes the request and connects to a satellite transponder. Because the transponder data rate usually exceeds the bandwidth of the network between the Satellite Receiver System 19 and the NSTB 44, the data must be filtered. One embodiment of a filter in the present invention filters the transport streams by Packet Identifier ("PID"). In this case, the NSTB 44 request may include PIDs of interest. The filtering process reduces the data rate down by extracting only the streams with requested PIDs. This reduced data rate should not exceed the bandwidth limit of the network. It should be noted that as the number of NSTBs 44 on the network increases, the number of tuners available for each NSTB may decrease because the NSTBs can share the Satellite Receiver System's tuners.

Another aspect of the architecture of FIG. 1 is the ability to synchronize the MxU network clock to the A/V data signal provider's system clock. As described above, the Satellite Receiver System 19 receives broadcast audio/video (A/V) data signals. These signals are composed of transport packets, and some of these transport packets contain an embedded time stamp from the broadcast system. The embedded time stamp can be used for buffer and color burst control. The Satellite Receiver System 19 converts the transport packets to IP data signals for the NTSBs. In this process jitter is introduced, and the original system clock-information is lost.

Because the Satellite Receiver System 19 is capable of tuning to multiple transponders and receiving multiple video channels, each of which may have a unique system clock, unique clock jitter can be introduced to every channel. The Satellite Receiver System 19' can be modified to remove the jitter introduced by the conversion process and thus provide a jitter free time base for the NSTBs.

Figures 2, 3:
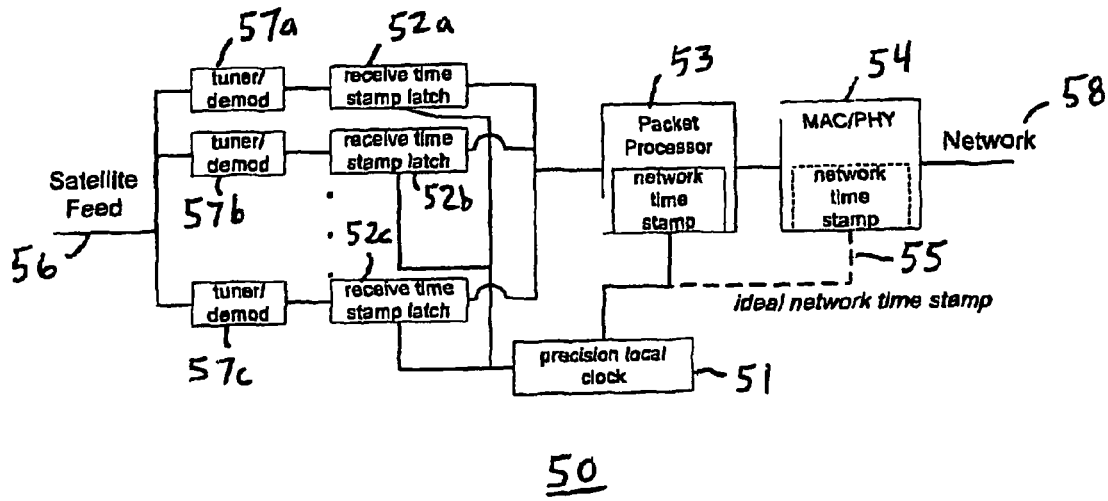
FIG. 2 is a block diagram of a satellite receiver in accordance with embodiments of the present invention.
FIG. 3 is a block diagram of a transport packet used for passing the parameters for the Altered Corrected Network Time Stamp ("ACNTS") in accordance with embodiments of the present invention.

FIG. 2 is a block diagram of a Satellite Receiver System in accordance with embodiments of the present invention and is designated using a reference numeral 50. A precision local clock ("PLC") 51 may be adapted to time stamp only specific network packets. Using the PLC 51 and a time compensation algorithm, accurate time stamps for a given A/V data signal can be applied to the packets of an outgoing IP data signal. Among the advantages of this method is that it only requires one system clock on the Satellite Receiver System 50 and does not require an actual phase lock clock per video channel. For a DirecTV satellite system, the frequency of the PLC 51 should be no slower than 27 MHz. It should be noted that a faster clock may reduce the computation error.

A satellite feed 56 is received by a plurality of tuner/demodulators 57a-57c. Each of the tuner/demodulators 57a-57c corresponds to a different received channel. The output of each of the tuner/demodulators 57a-57c is delivered to a corresponding receive time stamp latch ("RTSL") 52a-52c. The PLC 51 is adapted to function as a source clock to the plurality of receive time stamp latches 52a-52c.

Each of the RTSLs 52a-52c adds a time stamp onto every A/V data signal transport packet as it is received. A Packet Processor 53 is configured to detect the packets within the A/V data signal that have the embedded time stamp. This configuration may be based on PID/SCID, packet type or the like. The Packet Processor 53 saves the RTSL 52 and the broadcast A/V stream embedded time stamp ("SCR") and has the ability to process the two time stamps to create a normalized clock rate as shown in Equations 1,2, and 3. Normalizing the Broadcast System Clock to the PLC provides a time adjustment factor ("TAF").

Broadcast A/V Stream Clock Delta:

$$\Delta SCR = SCR_n - SCR_{n-1}, n>0 \qquad \text{Equation 1}$$

Precision Local Clock Delta:

$$\Delta RTSL = RTSL_n - RTSL_{n-1}, n>0 \qquad \text{Equation 2}$$

Normalizing the Broadcast System Clock to the PLC provides a time adjustment factor (TAF):

$$TAF = \frac{\Delta SCR}{\Delta RTSL} \qquad \text{Equation 3}$$

The principal behind applying time stamps to IP packets is to allow multiple devices on a network to synchronize their clocks with a sender or server. There are several network protocols that may be used to apply time stamps. In one network protocol, the time stamps are not applied at the physical layer. This protocol requires the use of statistical methods to remove the jitter introduce after a time stamp has been applied to the packet and before the packet is put on the physical network. These statistical methods are known to one skilled in art, and will not be discussed in detail. Another network protocol involves applying the time stamp to the network packet at the physical layer. In this method, assuming that the delay path between the sender and receiver is constant, the jitter that is introduced by the system can be removed if the receiving device also applies a time stamp at the physical layer and then synchronizes its clock to the sender's clock.

The following discussion relates to how the sender applies an accurate time stamp to a network packet. The Satellite Receiver System 50 has several options to transmit IP data signal time stamp packets. One option is to use standard protocols, such as NTP, RTP and the like. Another option is to create a new transport packet with the correct timing information in same format as the A/V data signal time stamp. Either implementation requires the Satellite Receiver to apply the correct time stamp for a targeted video channel. One way to do this is to apply the time stamp to the IP data signal time stamp packet as it is being transmitted onto a physical, network 55. In this embodiment, a local counter using the PLC 59 latches a network time stamp ("NTS") that is applied to an IP data signal time stamp packet. Because the NTS is not synchronized with the embedded time stamp from the A/V data signal, it can be adjusted as shown in Equation 4 to produce a Corrected Network Time Stamp ("CNTS"). Because the CNTS has been adjusted by the TAF from Equation 3, it is synchronized with the embedded time stamp in the A/V data signal. The result is a system that does not require multiple voltage controlled crystal oscillators ("VCXOs"), and applies an accurate jitter free time stamp to the IP data signal time stamp packet.

Corrected Network Time Stamp (CNTS):

$$CNTS = NTS \times TAF \qquad \text{Equation 4}$$

The method described above is for an ideal system in which the PLC 51 does not drift and there are no calculation errors in the CNTS. There are several methods that can be used to minimize the effects of clock drift and calculation errors in a non-ideal system. First, it will reduce errors if the PLC is an accurate crystal with drift less than +–10 parts per million ("ppm"). Next, since the Satellite Receiver System determines when a network time stamp packet is sent, the TAF can be averaged over only that period of time to provide a more accurate CNTS. This window average, called the Altered CNTS ("ACNTS") is shown in Equation 5.

Altered CNTS (ACNTS);

$$ACNTS = NTS \times \frac{\sum_{k=n}^{N}(SCR_k - SCR_n)}{\sum_{k=n}^{N} RTSL_k - RTSL_n}, \qquad \text{Equation 5}$$

where:

n is the first unused sample

N is the latest sample, a sample is taken when the time stamps are detected in the transport stream Equation 5 can be further simplified by controlling how the time stamps are collected. If this is done, Equation 5 becomes:

$$ACNTS = NTS \times \frac{SCR_N - SCR_n}{RTSL_N - RTSL_n}, \qquad \text{Equation 6}$$

as long as register overflow and counter wrap around are compensated.

There are several different network time stamp protocols, such as NTP, RTP and the like. These protocols generally require the CNTS or ACNTS values to be calculated by the sending unit, in this case the Satellite Receiver System 50.

Thus, in one embodiment, the Satellite Receiver System calculates one ACNTS per video channel. In another embodiment, the system uses a transport packet or a property packet to pass the ACNTS parameters to the client or receiver which performs the ACNTS calculation.

FIG. 3 is a block diagram an embodiment of a transport packet that may be used for passing the parameters for the Altered Corrected Network Time Stamp ("ACNTS") in accordance with embodiments of the present invention and designated using a reference numeral 60. The packet 60 may comprise an IP header, a UDP header, a transport header, a network time stamp ("NTS"), an $SCR_N$, an $SCR_n$, an $RTSL_N$ and an $RTSL_n$. The embodiment illustrated in FIG. 3 may reduce the processing requirement of the Satellite Receiver by requiring the NSTB to calculate the ACNTS for each channel that it is using. The Satellite Receiver System may still insert the NTS, but the rest of the packet's parameters need not be applied to the network packet until the packet is actually sent. The NSTB calculates the ACNTS using equation 5 or 6 when it receives the packet.

The system outlined above may comprise a clock recovery scheme for a system that provides an accurate time stamping of packets at the endpoints of a network (the Satellite Receiver System and the NSTB). This system may reduce the clock jitter introduced by intermediate network devices such as off-the-shelf Gigabit and Ethernet QAM switches. It should be noted, however, that inserting the time stamp as the network time stamp packet is placed onto the network may require additional hardware and costs. For this reason, another embodiment of this invention is a system that produces little or no jitter. Such a system may be referred to as a jitterless MxU system.

FIG. 4 is a block diagram of a network in which embodiments of the present invention may be employed. The diagram is generally referred to by the reference numeral 80. Removing component jitter is primarily based on knowing the clock relationships between two physically connected network devices. For example, in the system 80, there are N network devices that are connected to each other. Each network device has its own clock and it is desired to synchronize device N's 85 clock to device A's 81 clock.

Because this system 80 does not restrict the device N's 85 ability to synchronize to any other device, the device N's first task may be to synchronize its clock to any of the other devices in the system. To allow this flexibility, the two network devices that are synchronizing may establish a clock relationship between themselves. Because N is the endpoint in system 80, the clock relationship from left to right will be CA/CB, CB/CC, CC/CD, and so on, where CA is the clock in the device A, CB is the clock in device B and so on. The clock relationship is established by sending time stamped network packets to a related device. For example, the device A 81 sends a time stamp packet to the device B 82. The device A 81 applies the time stamp just before the packet is put on the physical network. The arrival time for the packet to reach the device B is delayed by the constant $C_{AB}$. The device B uses it local clock to capture the arrival time of the network packet from the device A. After receiving two of these packets, the device B can calculate the clock relation between the devices A and B (CA/CB), as shown in Equation 7.

$$CA/CB = \frac{CA_n - CA_{n-1}}{CB_n - CB_{n-1}} \qquad \text{Equation 7}$$

Once all the clock relationships in system 80 are known, the system 80 can synchronize the device N's clock to the device A's clock. In order to achieve clock synchronization the receiver (the device N 85) needs at a minimum two clock recover packets from the sender (the device A 81). Even though the physical wire between the two devices is considered a fixed delay, the delay between each device is not necessarily fixed. The objective is to compensate for delay that's introduced by each device and to quantify the unit delays in the sender's (A) clock units.

The device A sends a clock recovery network packet to the device N. This packet may be a modified IP time stamp packet as discussed above. Two fields are added to the packet, clock rate and delay ticks. "Clock rate" defines the clock ratios as the packet goes through the system. "Delay ticks" is accumulation of delays for each device in the sender's tick units. When the device A sends a clock recovery packet to the device N, the clock recovery packet initially has the clock rate set to 1 and the delay ticks to 0.

FIG. 5 is a block diagram of an alternative network configuration in which embodiments of the present invention may be employed. The diagram is generally referred to by the reference numeral 90. The packet Is time stamped by device A and sent to device B. The device B captures the arrival time of the packet and determines where to route the packet and any processing that is required. When the packet is ready to be transmitted, the device B recognizes that the packet is a clock recovery packet and captures a departure time. The device B then computes the delay between the time stamps (see Equation 8) and multiples them by CA/CB (see Equation 9). This result is then added to the "delay ticks" in the clock recovery packet, and the "clock rate" from the packet is multiplied by CA/CB and then written back into the clock recovery packet. This process is repeated at each network device until the packet is received by the device N. This process is shown mathematically in Equations 10, 11, and 12. Equation 13 shows how to determine the overall clock error between the device A and the device N.

The delay for B:

$$t_b = DepartureTime - ArrivalTime, \quad \text{Equation 8}$$

units are in B's clock

The delay for B in A's clock units:

$$tA_b = \frac{CA}{CB} \times t_b \quad \text{Equation 9}$$

Clock Ratio though the system $$ClockRatio = \frac{CA}{CB} \times 1 + \left(\frac{CA}{CB}\right)\frac{CB}{CC_c} + \left(\frac{CA}{CB}\frac{CB}{CC}\right)\frac{CC}{CD} \times \ldots \times \ldots \quad \text{Equation 10}$$

The variable delay through the system in A's clock units (delay ticks)

$$DelayTicks = \quad \text{(Equation 11)}$$
$$\frac{CA}{CB} \times t_b + \left(\frac{CA}{CB}\right)\frac{CB}{CC} \times t_c + \left(\frac{CA}{CB}\frac{CB}{CC}\right)\frac{CC}{CD} \times t_d + \ldots + \ldots$$

Therefore:

$$DelayTicks = \sum_{k=B}^{m}\left(t_k \times \prod_{n=B}^{k}\frac{C_{n-1}}{C_n}\right), \quad \text{Equation 12}$$

m is the last device before N

Clock Error = (Equation 13)

$$\left[1 - \left(\frac{(ACTS_n + DelayTicks_n) - (ACTS_{n-1} + DelayTicks_{n-1})}{ArrivalTime_n - ArrivalTime_{n-1}}\right)\right] \times 1e^{-6}, \text{(ppm)}$$

Equation 13 does not have to be used to adjust N's clock. It is the clock error in parts per million (ppm).

The device N receives the clock recovery packet and captures the arrival time. The information in the packet and the arrival time are saved. Once a second clock recovery packet is received, the device N can synchronize its clock to A's clock using the respective arrival times and the information in the recovery packets.

FIG. 6 is a block diagram of a clock recovery packet in accordance with embodiments of the present invention. The clock recovery packet is generally referred to by the reference numeral 100. The clock recovery packet 100 comprises an ACTS, a clock rate component and a delay ticks component.

Figure 7:
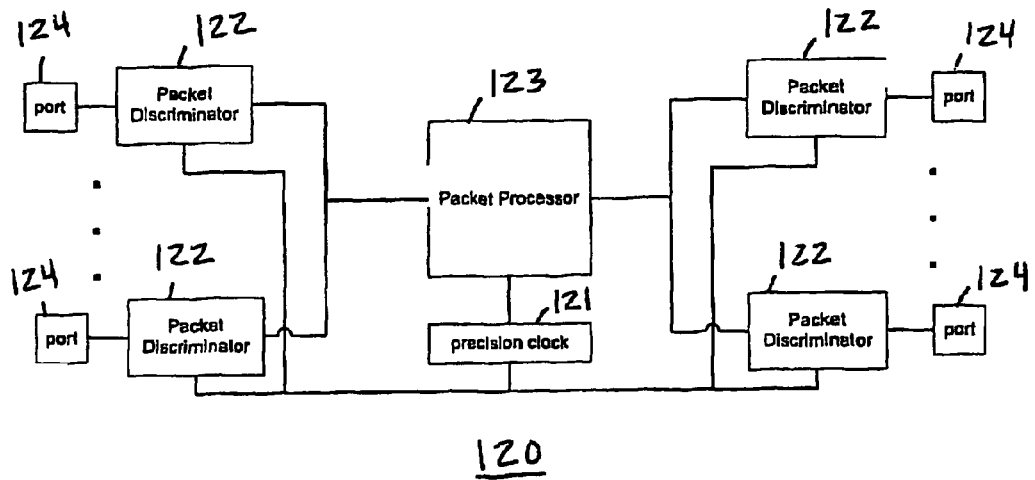
FIG. 7 is a block diagram of a device that performs clock jitter removal in accordance with embodiments of the present invention.

Turning now to FIG. 7, a block diagram of a device that performs clock jitter removal in accordance with embodiments of the present invention is illustrated. The diagram is generally referred to by a reference numeral 120. A standard router and switches will not perform the time stamping and packet modification required for a jitterless MxU network. The network 120 requires a precision-clock 121 with little error. This clock is shared by a plurality of packet discriminators 122 and can be used by a packet processor 123. The packet discriminators 122 are connected to the physical ports 124 and are capable of time stamping incoming and outgoing packets.

Figure 8:
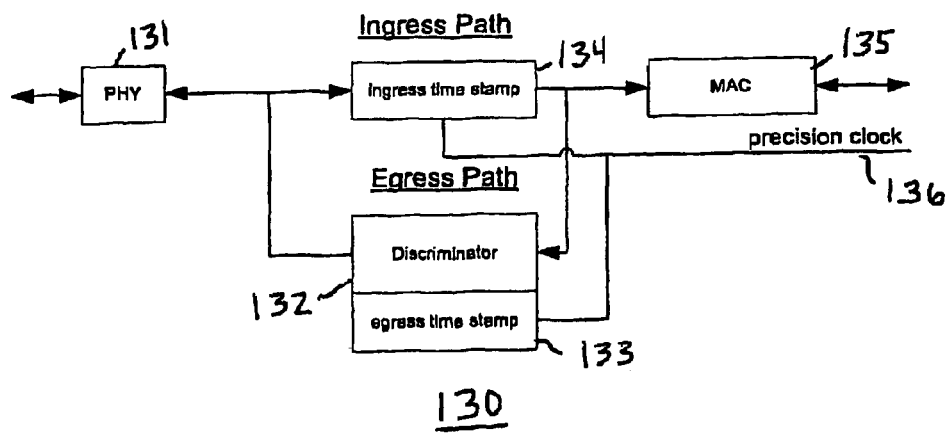
FIG. 8 is a block diagram of a packet discriminator in accordance with embodiments of the present invention.

FIG. 8 is a block diagram of a packet discriminator in accordance with embodiments of the present invention. The packet discriminator is generally referred to by the reference numeral 130. When a packet arrives, it is time stamped, and the time stamp is saved with the packet. As the packet is being transmitted through physical port 131, a discriminator 132 scans the packets for a clock recovery packet. If a packet of this type is detected, the discriminator 132 captures a time stamp 133. The discriminator then uses the previous and current time stamps to compute the new "delay ticks" and "clock ratio", which are written back into the packet. The checksum and cyclic redundancy code ("CRC") are computed, and the packet is transmitted.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A system for synchronizing clocks across a network, comprising:

a device that receives a signal from a broadcast source that comprises a plurality of packets, at least a portion of the plurality of packets comprising an embedded time stamp;

a device that detects the at least a portion of the plurality of packets containing the embedded time stamp; and a device that computes an adjusted time stamp based on the embedded timestamp and a precision local clock and incorporates the adjusted timestamp into the at least a portion of the plurality of packets containing the embedded timestamp after converting the at least a portion of the packets into Internet Protocol packets and prior to transmitting the at least a portion of the plurality of packets to the network.

2. The system set forth in claim 1, wherein each of the plurality of packets receive a localized timestamp based on the precision local clock regardless of whether they contain the embedded timestamp.

3. The system set forth in claim 1, wherein the network comprises a plurality of network set top boxes ("NSTBs").

4. The system set forth in claim 3, wherein time synchronization data is sent to the NSTBs in a transport packet.

5. The system set forth in claim 4, wherein each of the NSTBs is adapted to employ the transport packet to synchronize an internal clock to the embedded time stamps based on the time synchronization data.

6. The system set forth in claim 1, wherein a normalized clock rate is computed from the embedded time stamp and the precision local clock.

7. The system set forth in claim 1, wherein a time adjustment factor is computed.

8. A method for synchronizing clocks across a network, the method comprising the acts of:

receiving a broadcast signal that comprises a plurality of packets, at least a portion of the plurality of packets comprising an embedded time stamp;

detecting packets containing the embedded time stamp;

computing an adjusted time stamp based on the embedded timestamp and a precision local clock;

converting the at least a plurality of the packets into Internet Protocol packets;

incorporating the adjusted timestamp into the at least a portion of the plurality of packets containing the embedded timestamp; and transmitting the at least a portion of the plurality of packets to the network.

9. The method set forth in claim 8, comprising the act of incorporating a localized timestamp based on the precision local clock into each of the plurality of packets regardless of whether they contain the embedded timestamp.

10. The method set forth in claim 8, wherein the act of transmitting the at least a portion of the plurality of packets to the network comprises transmitting the at least a portion of the plurality of packets to a plurality of network set top boxes ("NSTBs").

\* \* \* \* \*